US012247373B2

(12) United States Patent
Komori

(10) Patent No.: US 12,247,373 B2
(45) Date of Patent: Mar. 11, 2025

(54) HYDRAULIC DRIVE SYSTEM AND CONSTRUCTION MACHINE

(71) Applicant: NABTESCO CORPORATION, Tokyo (JP)

(72) Inventor: Etsuro Komori, Tokyo (JP)

(73) Assignee: NABTESCO CORPORATION, Tokyo (JP)

( * ) Notice: Subject to any disclaimer, the term of this patent is extended or adjusted under 35 U.S.C. 154(b) by 0 days.

(21) Appl. No.: 18/496,276

(22) Filed: Oct. 27, 2023

(65) Prior Publication Data

US 2024/0175242 A1 May 30, 2024

(30) Foreign Application Priority Data

Nov. 29, 2022 (JP) ................................ 2022-190160

(51) Int. Cl.
*E02F 9/22* (2006.01)
*F15B 11/16* (2006.01)

(52) U.S. Cl.
CPC .......... *E02F 9/2203* (2013.01); *E02F 9/2232* (2013.01); *E02F 9/2296* (2013.01);
(Continued)

(58) Field of Classification Search
CPC .............. F15B 11/16; F15B 2211/7058; F15B 2211/7107; F15B 2211/763;
(Continued)

(56) References Cited

U.S. PATENT DOCUMENTS 3,874,173 A * 4/1975 Wilkins .................. F16H 61/46
60/431
3,992,883 A * 11/1976 Cope ...................... F15B 11/16
60/494

(Continued)

FOREIGN PATENT DOCUMENTS

EP 2351937 A1 8/2011
EP 2681365 B1 5/2018

(Continued)

OTHER PUBLICATIONS

Extended European Search Report dated Apr. 22, 2024, issued in corresponding European Patent Application No. 23206047.5 (7 pgs.).

*Primary Examiner* — Michael Leslie
(74) *Attorney, Agent, or Firm* — Pillsbury Winthrop Shaw Pittman, LLP

(57) ABSTRACT

The hydraulic drive system includes a hydraulic pump, a plurality of variable displacement actuators, and a control unit. The hydraulic pump discharges a hydraulic fluid. The variable displacement actuators each receive a pressure of the hydraulic fluid discharged from the hydraulic pump to operate corresponding one of a plurality of drive parts. The control unit controls displacement varying parts of the variable displacement actuators. The control unit controls the displacement varying parts of the variable displacement actuators, based on sensed pressures in fluid inflow parts of the variable displacement actuators in operation, such that the pressures in the fluid inflow parts of the variable displacement actuators in operation approach a common target pressure.

6 Claims, 6 Drawing Sheets

(52) U.S. Cl.
CPC ....... *F15B 11/16* (2013.01); *F15B 2211/3138* (2013.01); *F15B 2211/7058* (2013.01); *F15B 2211/7107* (2013.01); *F15B 2211/763* (2013.01); *F15B 2211/782* (2013.01)

(58) Field of Classification Search
CPC . F15B 2211/782; E02F 9/2203; E02F 9/2221; E02F 9/2232; E02F 9/2235; F16H 61/4008; F16H 61/4148; F16H 61/421; F16H 61/425; F16H 61/44
See application file for complete search history.

(56) References Cited

U.S. PATENT DOCUMENTS

| | | | | | |
|---|---|---|---|---|---|
| 4,769,991 | A * | 9/1988 | Johnson | F15B 13/022 60/426 |
| 5,857,330 | A * | 1/1999 | Ishizaki | F16H 61/40 60/426 |
| 7,043,907 | B2 * | 5/2006 | Asano | F15B 11/163 91/380 |
| 9,995,387 | B2 * | 6/2018 | Wiertellok | F16H 61/421 |
| 2012/0020811 | A1 * | 1/2012 | Kraeutler | F01P 7/044 417/46 |
| 2013/0133319 | A1 * | 5/2013 | Lacher | F16H 61/421 60/327 |
| 2016/0144893 | A1 | 5/2016 | Wiertellok et al. | |

FOREIGN PATENT DOCUMENTS

| | | | |
|---|---|---|---|
| JP | 2005-147257 | A | 6/2005 |
| JP | 2020-204172 | A | 12/2020 |

* cited by examiner

HYDRAULIC DRIVE SYSTEM AND CONSTRUCTION MACHINE

CROSS-REFERENCE TO RELATED APPLICATIONS

This application is based on and claims the benefit of priority from Japanese Patent Application Serial No. 2022-190160 (filed on Nov. 29, 2022), the contents of which are hereby incorporated by reference in their entirety.

TECHNICAL FIELD

The present disclosure relates to a hydraulic drive system and a construction machine.

BACKGROUND

Some known construction machines such as a hydraulic excavator include a self-propelled undercarriage, a slewable upper structure supported by the undercarriage so as to be slewable (see, e.g., Japanese Patent Application Publication No. 2020-204172). The slewable upper structure includes a cab for an operator and an articulated operation unit. The articulated operation unit includes a boom, an arm, a bucket and the like. Drive parts operated by hydraulic pressure (oil pressure) are provided between the cab and the boom, between the boom and the arm, and between the arm and the bucket. Each of the drive parts may include a constant-displacement hydraulic actuator.

In an apparatus such as the construction machine described above, multiple drive parts driven by hydraulic pressure may be operated by a common hydraulic drive system. In this case, the hydraulic drive system controls the pressure of the hydraulic fluid discharged from the hydraulic pump to a constant value in the main feed channel. A plurality of branch passages branching off from the main feed channel are connected to a respective hydraulic actuator such as a hydraulic motor for operating each drive part. Each hydraulic actuator has a preset displacement (flow rate of the hydraulic fluid to be consumed) to achieve a preset work performance when each drive part is operated individually. The pressure of the hydraulic fluid fed to each hydraulic actuator through the branch passage is determined by the magnitude of the load acting on each hydraulic actuator.

The conventional hydraulic drive system described above can have the system pressure and the drive pressure of the hydraulic actuators substantially equal to each other. Therefore, in the case where each drive is operated individually, good energy efficiency can be achieved.

However, in the case where multiple drive parts are operated simultaneously, it is difficult to maintain good overall energy efficiency. Specifically, in the conventional hydraulic drive system described above, the pressure in the main feed channel is controlled to match the required pressure of the hydraulic actuator in which the pressure at the inlet is the largest. Therefore, the pressure energy of the hydraulic fluid used by the rest of the hydraulic actuators contains excess energy. Therefore, this excess energy needs to be consumed, for example, as a pressure drop by reducing the cross-section of the channel in a branch passage, or consumed by returning some of the hydraulic fluid to a tank. Therefore, in the conventional hydraulic drive system described above, much of the hydraulic fluid once pressurized to a high pressure is consumed as a pressure drop for reducing the pressure or is returned to the tank, thus wasting the hydraulic energy.

SUMMARY

The present disclosure provides a hydraulic drive system and a construction machine capable of reducing energy loss occurring when multiple drive parts are operated simultaneously.

(1) A hydraulic drive system according to one aspect of the disclosure comprises: a hydraulic pump for discharging a hydraulic fluid; a plurality of variable displacement actuators each configured to receive a pressure of the hydraulic fluid discharged from the hydraulic pump to operate corresponding one of a plurality of drive parts; and a control unit for controlling respective displacement varying parts of the plurality of variable displacement actuators. The control unit controls the displacement varying parts of the variable displacement actuators, based on sensed pressures in fluid inflow parts of the variable displacement actuators in operation among the plurality of variable displacement actuators, such that the pressures in the fluid inflow parts of the variable displacement actuators in operation approach a common target pressure.

With this configuration, when multiple drive parts are operated simultaneously, the displacements of the variable displacement actuators are controlled such that the pressures in the fluid inflow parts of the multiple variable displacement actuators in operation approach a common target pressure. This allows the variable displacement actuators to consume the hydraulic fluid at such a flow rate as to provide the required amount of work to respective corresponding drive parts, with the pressures in the fluid inflow parts maintained close to the target pressure that is common to the actuators. As a result, the hydraulic fluid once pressurized to a high pressure by the hydraulic pump does not need to be significantly depressurized in the feed channels for the actuators, thus reducing energy loss.

(2) It is also possible that the control unit controls the displacement varying parts of the variable displacement actuators such that displacements of the variable displacement actuators in operation are varied within respective ranges from rated minimum displacements to rated maximum displacements of the variable displacement actuators.

In this configuration, the actuators for operating the displacement varying parts of the variable displacement actuators will not receive command values for varying the displacements to exceed the rated maximum displacements of the variable displacement actuators or command values for varying the displacements to fall below the rated minimum displacements of the variable displacement actuators. This inhibits excessive load from acting on the actuators.

(3) It is also possible that the control unit controls the displacement varying parts of the variable displacement actuators such that an overall flow rate of the variable displacement actuators in operation is equal to or less than a prescribed flow rate.

This configuration eliminates the possibility that the actuators operating the displacement varying parts of the variable displacement actuators receive a command value for causing the overall flow rate of the variable displacement actuators in operation to exceed the prescribed flow rate. Therefore, it is possible to eliminate the problem of the actuators receiving a command value exceeding the prescribed flow rate, thus failing to feed the hydraulic fluid to each variable displacement actuator at the appropriate flow rate.

(4) It is also possible that the control unit controls the displacement varying parts of the variable displacement actuators such that an overall horsepower of the variable displacement actuators in operation is equal to or less than a prescribed horsepower.

This configuration eliminates the possibility that the actuators operating the displacement varying parts of the variable displacement actuators receive a command value for causing the overall horsepower of the variable displacement actuators in operation to exceed the prescribed horsepower. Therefore, it is possible to eliminate the problem of the actuators receiving a command value exceeding the prescribed horsepower, thus causing an excessive load to act on the drive source that drives the hydraulic pump.

(5) A construction machine according to one aspect of the disclosure comprises: a plurality of drive parts; and a hydraulic drive system configured to receive a pressure of a hydraulic fluid to operate the plurality of drive parts. The hydraulic drive system includes: a hydraulic pump for discharging a hydraulic fluid; a plurality of variable displacement actuators each configured to receive a pressure of the hydraulic fluid discharged from the hydraulic pump to operate corresponding one of a plurality of drive parts; and a control unit for controlling respective displacement varying parts of the plurality of variable displacement actuators. The control unit controls the displacement varying parts of the variable displacement actuators, based on sensed pressures in fluid inflow parts of the variable displacement actuators in operation among the plurality of variable displacement actuators, such that the pressures in the fluid inflow parts of the variable displacement actuators in operation approach a common target pressure.

In the hydraulic drive system according to the disclosure, when multiple drive parts are operated simultaneously, the displacements of the variable displacement actuators are controlled such that the pressures in the fluid inflow parts of the variable displacement actuators in operation approach a common target pressure, while the variable displacement actuators provide a required amount of work to respective corresponding drive parts. Thus, much of the hydraulic fluid once pressurized to a high pressure by the hydraulic pump does not need to be discharged for reducing the pressure in the feed channels for the actuators. This makes it possible to reduce energy loss occurring when multiple drive parts are operated simultaneously.

DESCRIPTION OF THE EMBODIMENTS

The embodiments of the present disclosure will be hereinafter described with reference to the drawings. In this specification, "hydraulic pressure" encompasses pressure of a hydraulic fluid containing oil (oil pressure) and pressure of a hydraulic fluid not containing oil (water pressure and the like).

<Construction Machine>

Figure 1:
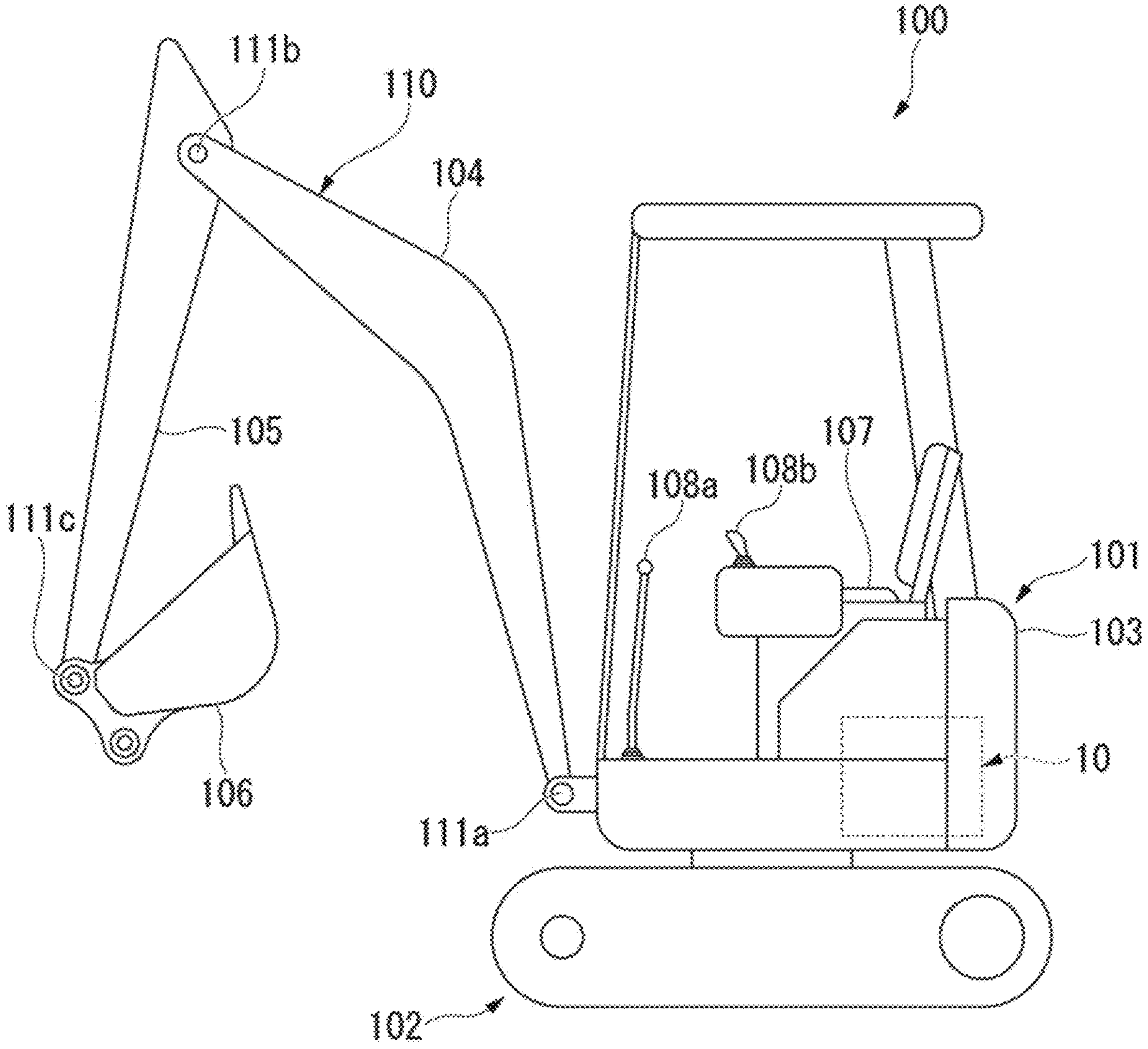
FIG. 1 schematically illustrates an excavator (construction machine) according to an embodiment, viewed from the side.

FIG. 1 schematically illustrates an excavator 100 as a form of a construction machine, viewed from the side. As shown in FIG. 1, the excavator 100 includes a slewable upper structure 101 and an undercarriage 102. The slewable upper structure 101 is provided on the undercarriage 102 so as to be slewable. The slewable upper structure 101 is equipped with a hydraulic drive system 10 that drives each part of the slewable upper structure 101 by hydraulic pressure. The undercarriage 102 includes, for example, crawlers that are placed on the road surface. The undercarriage 102 can travel on a road surface with the crawlers driven by a power source such as an engine or an electric motor. The traveling means of the undercarriage 102 is not limited to crawlers, but can also be wheels or the like.

The slewable upper structure 101 includes a cab 103 for an operator and an articulated operation unit 110 operated by the operator. The cab 103 is equipped with a seat 107 for the operator and a plurality of control units 108*a*, 108*b* such as levers and switches operated by the operator seated on the seat 107.

The articulated operation unit 110 includes a boom 104, an arm 105, and a bucket 106. The boom 104 is connected at its proximal end to the front end of the cab 103 so as to be swingable about a rotating shaft 111*a*. The arm 105 is connected at its proximal end to the distal end of the boom 104 so as to be swingable about a rotating shaft 111*b*. The bucket 106 is connected at its proximal end to the distal end of the arm 105 so as to be swingable about the rotating shaft 111*c*. The articulated operation unit 110 can scoop up, for example, earth, debris or the like, with the bucket 106 by operating the connection parts of the boom 104, the arm 105, and the bucket 106 in a combined manner. The connection parts of the articulated operation unit 110 are driven by variable displacement motors 12A, 12B, 12C (see FIG. 2), which will be described later. The connection parts driven by the variable displacement motors 12A, 12B, 12C are driven by directly driving the respective rotating shafts 111*a*, 111*b*, 111*c* (drive parts). However, this case is not limitative. For example, the connection parts may be driven by movable devices different from the rotating shafts 111*a*, 111*b*, 111*c*. The bucket 106 attached to the distal end of the articulated operation unit 110 is an example of an attachment. The attachment may be, for example, a mechanical fork or a hydraulic breaker instead of the bucket 106.

<Hydraulic Drive System>

Figure 2:
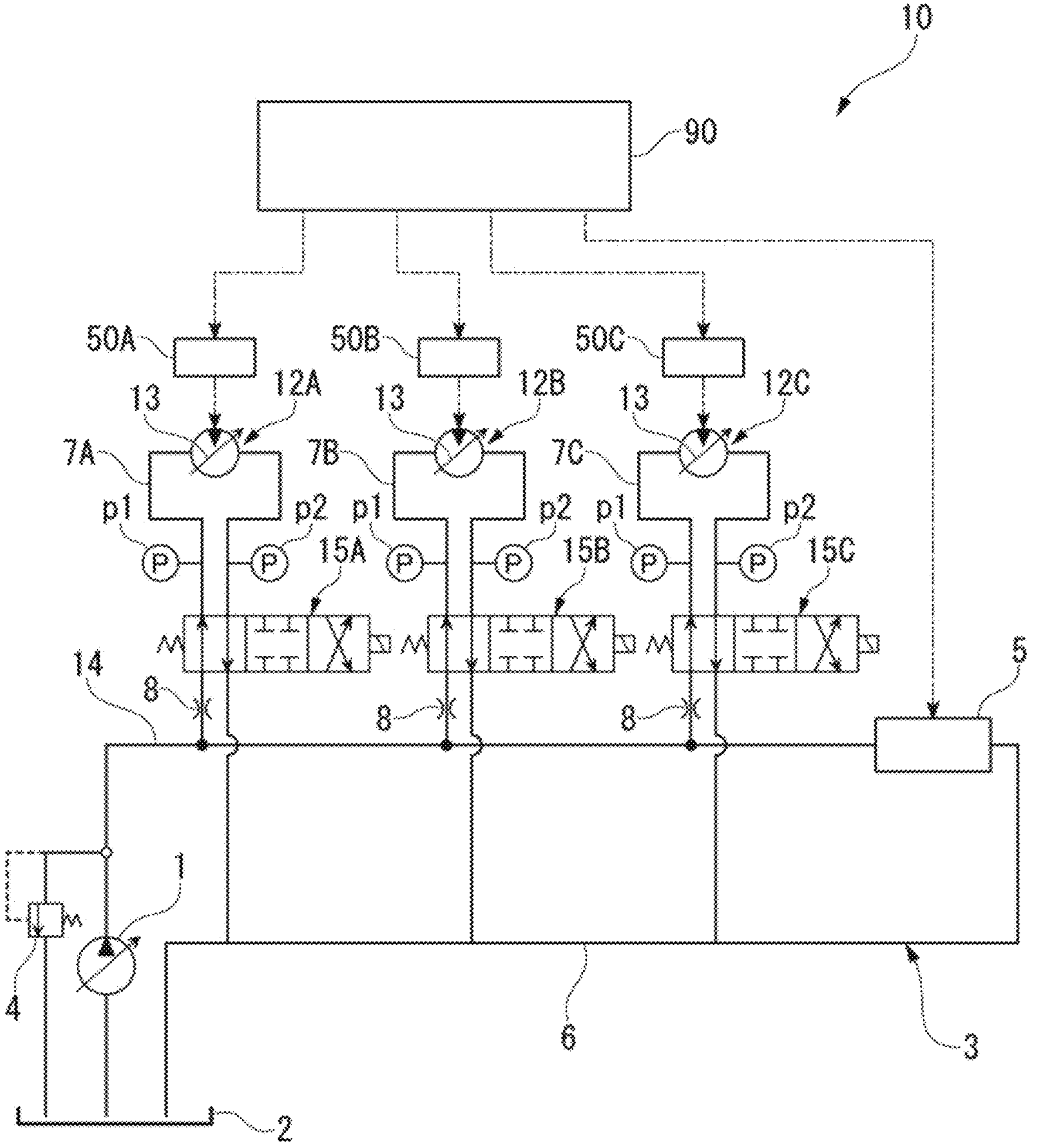
FIG. 2 is a circuit diagram of the hydraulic drive system according to the embodiment.

FIG. 2 is a circuit diagram of the hydraulic drive system 10 according to the embodiment. As shown in FIG. 2, the hydraulic drive system 10 can operate, for example, any of the connection parts (drive parts) of the articulated operation unit 110 of the excavator 100 simultaneously or individually. The hydraulic drive system 10 includes a hydraulic pump 1 that discharges hydraulic fluid, variable displacement motors 12A, 12B, 12C that receive pressure of the hydraulic fluid discharged from the hydraulic pump 1 and operate corresponding drive parts, and a controller 90 (control unit) that controls the displacement varying parts 13 of the variable displacement motors 12A, 12B, 12C. The variable displacement motors 12A, 12B, 12C have a respective output shaft (not shown). Between the output shafts of the variable displacement motors 12A, 12B, 12C and the drive parts, there are provided speed reducers (not shown) for reducing the rotational speed of the output shafts. In this embodiment, the variable displacement motors 12A, 12B, 12C constitute variable displacement actuators.

The hydraulic pump 1 is driven by a power source such as an engine or an electric motor. The hydraulic pump 1 discharges the hydraulic fluid stored in a tank 2 toward a main feed channel 14 of a hydraulic circuit 3. A relief valve 4 is provided upstream of the main feed channel 14 in the hydraulic circuit 3 to control excessive pressure rises in the hydraulic circuit 3. When the pressure in the hydraulic circuit 3 rises to an excessive level, the hydraulic fluid drained from the relief valve 4 is returned to the tank 2.

A diaphragm 5 is provided downstream of the main feed channel 14. The diaphragm 5 is connected at its downstream side to a return passage 6 for returning the hydraulic fluid from the main feed channel 14 to the tank 2.

The hydraulic circuit 3 includes a plurality (three) of branch passages 7A, 7B, 7C that branch off from the main feed channel 14. The branch passages 7A, 7B, 7C have corresponding variable displacement motors 12A, 12B, 12C provided thereon. Each of the branch passages 7A, 7B, 7C is connected at its upstream side to the main feed channel 14 via a diaphragm part 8 and connected at its downstream side to the return passage 6. The branch passages 7A, 7B, 7C are provided with channel-switching valves 15A, 15B, 15C, respectively, that extend across the portion connected to the main feed channel 14 and the portion connected to the return passage 6. The channel-switching valves 15A, 15B, 15C are formed of solenoid valves or the like that have four ports and can be switched to three positions. Specifically, these solenoid valves can be switched among two positions for switching the direction of the flow of the hydraulic fluid fed toward the variable displacement motors 12A, 12B, 12C and one position (stop position) for stopping the flow of the hydraulic fluid into the variable displacement motors 12A, 12B, 12C. The direction of rotation of the variable displacement motors 12A, 12B, 12C can be switched between the forward direction and the reverse direction by changing the direction of the flow of the hydraulic fluid by means of the channel-switching valves 15A, 15B, and 15C. The variable displacement motors 12A, 12B, and 12C stop rotating by the channel-switching valves 15A, 15B, 15C switched to the stop position. Each of the channel-switching valves 15A, 15B, 15C is switched to one of the above three positions upon receiving a switching instruction from the controller 90.

The variable displacement motors 12A, 12B, 12C are formed, for example, of a swash plate axial plunger motor having a swash plate of which the inclination angle can be adjusted as desired. This axial plunger motor has a well-known structure in which the inflow and outflow capacity of the hydraulic fluid by the plunger is varied by changing the inclination angle of the swash plate that regulates an advance/retreat stroke of the plunger. The inclination angle of the swash plate of the variable displacement motors 12A, 12B, 12C is changed by the actuators 50A, 50B, 50C for changing the inclination angle. The actuators 50A, 50B, 50C are controlled by the controller 90. The actuators 50A, 50B, and 50C are not limited to a specific structure as long as they can change the inclination angle of the swash plate to any angle upon receiving a control instruction from the controller 90. For example, the actuators 50A, 50B, 50C may change the inclination angle of the swash plate by hydraulic pressure or by an electric motor or an electromagnetic actuator.

In this embodiment, the variable displacement motors 12A, 12B, 12C are formed of swash plate axial plunger motors, but this example is not limitative. The variable displacement motors 12A, 12B, 12C may have any structure as long as they are hydraulic motors that can vary the inflow and outflow capacity of the hydraulic fluid based on an operation instruction from the controller 90. For example, the variable displacement motors 12A, 12B, 12C may be radial plunger motors or the like. A radial plunger motor includes a rotating block with a plurality of plungers arranged radially and a stroke regulation ring located outside the rotating block, and the inflow and outflow capacity of the plungers can be varied by changing the eccentricity of the stroke regulation ring. Furthermore, the type of the motors is not limited to the plunger type, but can be various types, such as the vane type or the gear type, for example.

The variable displacement motors 12A, 12B, 12C described above receive the pressure of the hydraulic fluid discharged from the hydraulic pump 1 and operate a plurality of connection parts (drive parts) of the articulated operation unit 110 of the excavator 100, for example. To operate any one of the multiple (three) drive parts (rotating shafts 111*a*, 111*b*, 111*c*) alone, the channel switching valves 15A, 15B, 15C are switched to open one of the branch passages 7A, 7B, 7C corresponding to the drive part to be operated and close the other two branch passages. The displacement of the variable displacement motors 12A, 12B, 12C to be operated and the pressure in the main feed channel 14 are controlled by the controller 90 to achieve the preset work capacity. The hydraulic fluid having been used to operate one of the drive parts returns to the tank 2 through the return passage 6. The operating direction of the drive part (the direction of rotation of the rotating shaft) operated at this time can be changed as needed by switching the position of the channel-switching valves 15A, 15B, 15C between two positions.

Each of the branch passages 7A, 7B, 7C has pressure sensors p1, p2 installed thereon for detecting the pressure of the hydraulic fluid. The pressure sensors p1, p2 are installed on the upstream portion and the downstream portion of the branch passages 7A, 7B, 7C with the variable displacement motors 12A, 12B, 12C in between. The pressure sensors p1, p2 are used separately in accordance with the direction of rotation of the variable displacement motors 12A, 12B, 12C, to sense the pressure in the fluid inflow part (high pressure side) of the variable displacement motors 12A, 12B, 12C. The sensing signals (the pressure of the hydraulic fluid) obtained by the pressure sensors p1, p2 are input to the controller 90. The controller 90 controls each part of the hydraulic drive system 10 based on the sensing signals from the pressure sensors p1, p2.

To operate all (three) drive parts (rotating shafts 111*a*, 111*b*, 111*c*) simultaneously, the channel-switching valves 15A, 15B, 15C are switched to open all branch passages 7A, 7B, 7C. This allows the hydraulic fluid flowing into the branch passages 7A, 7B, 7C to be fed to the corresponding variable displacement motors 12A, 12B, 12C. The hydraulic fluid having been used to operate all the drive parts returns to the tank 2 through the return passage 6.

The pressure in the fluid inflow part of each of the branch passages 7A, 7B, 7C (the upstream side of each of the variable displacement motors 12A, 12B, 12C) is sensed by one of the pressure sensors p1, p2. The sensing signals are input to the controller 90. The controller 90 receives the sensing signals and controls the displacement varying parts (e.g., the inclination varying parts of the swash plates) of the variable displacement motors 12A, 12B, 12C such that the pressures in the fluid inflow parts of the variable displacement motors 12A, 12B, 12C approach a common target pressure (target pressure). This allows the variable displacement motors 12A, 12B, 12C to provide the required amount of work to respective drive parts, with the pressures in the fluid inflow parts maintained close to the target pressure. In this embodiment, the target pressure can be set and adjusted by the controller 90. The target pressure may be set, for example, at 70 to 80% of the maximum pressure in the fluid inflow parts of the variable displacement motors 12A, 12B, 12C, which require the maximum flow rate to operate the drive parts. In this case, the required flow rate of each drive part can be reduced, and thus energy consumption can be reduced. The target pressure may also be set at about 50% of the maximum system pressure. In this case, the variation of displacement of the variable displacement motors 12A, 12B, 12C can be minimized.

Figure 3:
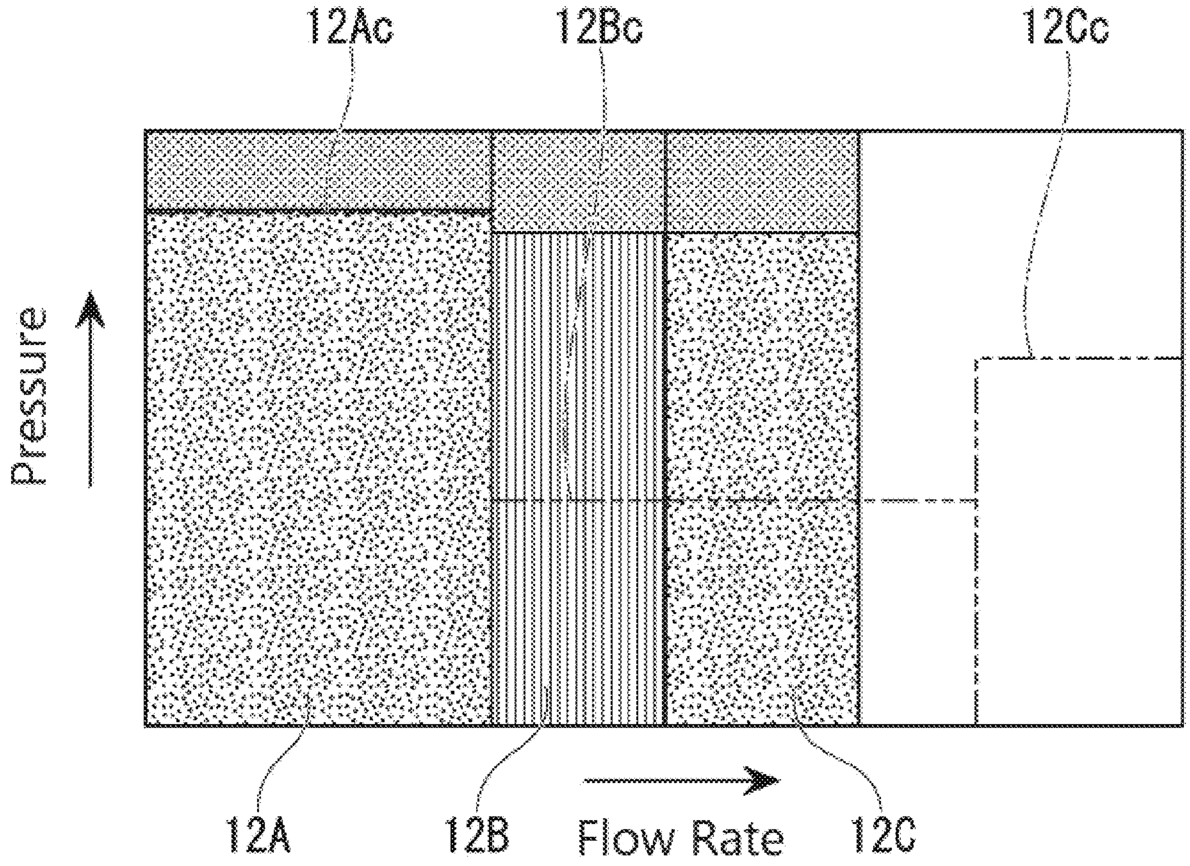
FIG. 3 shows a pressure-flow rate diagram of a variable displacement actuator of the hydraulic drive system according to the embodiment.

FIG. 3 shows the pressure and flow rate (flow rate of consumed hydraulic fluid) of the fluid inflow parts of the three variable displacement motors 12A, 12B, 12C in the case where all (three) drive parts are operated simultaneously. When all (three) drive parts are operated simultaneously in the hydraulic drive system 10 according to this embodiment, the pressure on the fluid inflow part side of each of the variable displacement motors 12A, 12B, 12C turns nearly uniform to approach the target pressure, as shown in FIG. 3. This provides each of the variable displacement motors 12A, 12B, 12C with the hydraulic fluid at the flow rate required for the drive part. Therefore, in the case where the displacement varying part 13 of each of the variable displacement motors 12A, 12B, 12C is controlled as described above in the hydraulic drive system 10 according to this embodiment, the overall consumed energy of the hydraulic fluid is reduced significantly, as shown in FIG. 3. The sections 12Ac, 12Bc, 12Cc shown by the two dotted lines in FIG. 3 indicate the pressure and flow rate (flow rate of consumed hydraulic fluid) in the inflow parts in the case where the displacement of each motor is constant (the case where variable displacement motors 12A, 12B, 12C are not employed).

Next, to operate any two of the multiple (three) drive parts (rotating shafts 111*a*, 111*b*, 111*c*) simultaneously, the channel switching valves 15A, 15B, 15C are switched to open two of the branch passages 7A, 7B, 7C shown in FIG. 2 corresponding to the two drive parts and close the remaining one branch passage. The pressure in the fluid inflow part of each of the two opened branch passages among the branch passages 7A, 7B, 7C (the upstream side of each of the variable displacement motors 12A, 12B, 12C) is sensed by one of the pressure sensors p1, p2. The sensing signals are input to the controller 90. The controller 90 receives the sensing signals and controls the displacement varying parts 13 of the two variable displacement motors such that the pressures in the fluid inflow parts of the two variable displacement motors among the variable displacement motors 12A, 12B, 12C approach a common target pressure (target pressure). In this case, each of the two variable displacement motors consumes the hydraulic fluid at a predetermined flow rate, with the pressure in each fluid inflow part maintained close to the target pressure. Thus, in this case, the overall consumed energy of the hydraulic fluid is also reduced.

Figure 4:
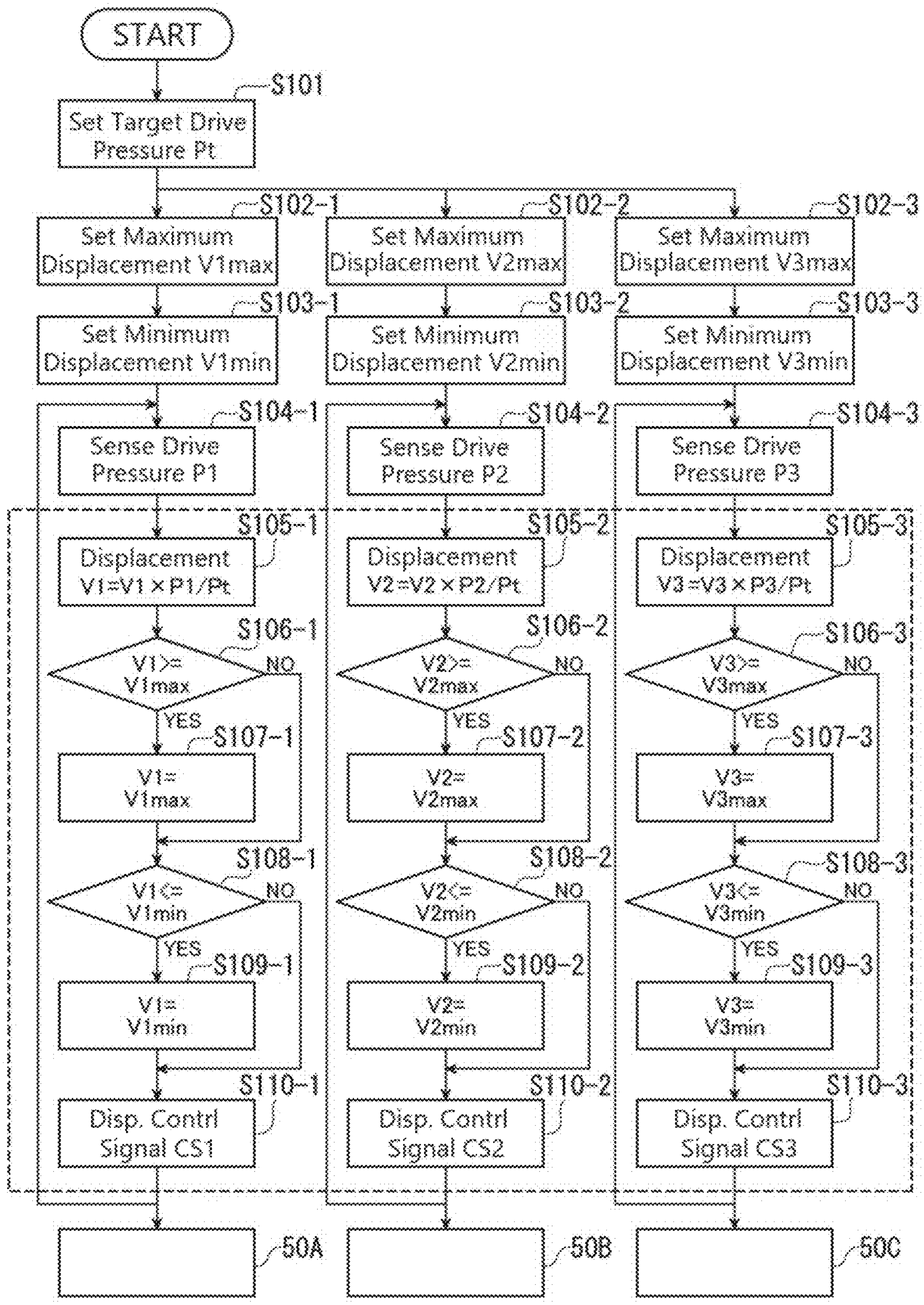
FIG. 4 is a flowchart showing an example of control of the hydraulic drive system according to the embodiment.

An example of control of the hydraulic drive system 10 will now be explained with reference to the flowchart shown in FIG. 4. FIG. 4 shows the flow of control in the case where all (three) drive parts are operated simultaneously. In FIG. 4, each step is denoted by a three-digit number (e.g., S102) followed by a hyphen ("-") and an attached number. This attached number refers to relationship to the variable displacement motors 12A, 12B, 12C. Specifically, the steps related to variable displacement motor 12A are marked with the numeral "1" following the hyphen ("-"), the steps related to variable displacement motor 12B are marked with the numeral "2" following the hyphen ("-"), and the steps related to variable displacement motor 12C are marked with the numeral "3" following the hyphen ("-"). The steps related to the variable displacement motors 12A, 12B, 12C have almost the same content, so the steps related to variable displacement motor 12A are described in detail below as a representative, and the steps related to the other variable displacement motors 12B and 12C are omitted from detailed description.

In step S101, the target drive pressure Pt (target pressure) is set. In step S102-1, the rated maximum displacement V1max (hereinafter referred to as "the maximum displacement V1max") of the variable displacement motor 12A is set. The maximum displacement V1max is, for example, a value stored in the memory in advance and read in. In step S103-1, the rated minimum displacement V1min (hereinafter referred to as "the minimum displacement V1min") of the variable displacement motor 12A is set. The minimum displacement V1min is, for example, a value stored in the memory in advance and read in. The heretofore steps may be performed only at system startup.

In step S104-1, the actual pressure P1 on the fluid inflow part side of the variable displacement motor 12A as sensed by the pressure sensor p1 or p2 is read.

In step S105-1, the displacement setting value V1 of the variable displacement motor 12A used when the control signal was output previous time is multiplied by the ratio of the actual sensed pressure P1 to the target drive pressure Pt to obtain the next displacement setting value V1. When the system is started up, an appropriate initial value (e.g., maximum displacement V1max) is assigned as the setting value V1 to be multiplied by the ratio of the actual sensed pressure P1 to the target drive pressure Pt.

In step S106-1, it is determined whether or not the calculated value V1 is greater than or equal to the maximum displacement V1max, and if it is greater than or equal to the maximum displacement V1max (if YES), the process proceeds to step S107-1, where the value of the maximum displacement V1max is assigned to the value V1. If the calculated value V1 is smaller than the maximum displacement V1max (if NO), the process proceeds to step S108-1.

In step S108-1, it is determined whether or not the calculated value V1 is equal to or smaller than the minimum displacement V1min, and if it is equal to or smaller than the minimum displacement V1min (if YES), the process proceeds to step S109-1, where the value of the minimum displacement V1min is assigned to the value V1, and then the process proceeds to step S110-1. If the calculated value V1 is greater than the minimum displacement V1min (if NO), the calculated value of step S105-1 is assigned to the value V1, and the process proceeds to step S110-1.

In step S110-1, the setting value V1 is updated with the value V1 determined in steps S105-1 to S109-1, and the displacement control signal CS1 corresponding to the updated value V1 is output to the actuator 50A for varying the displacement of the variable displacement motor 12A. The processing from step S105-1 to step S110-1 (the processing from step S105-2 to step S110-2 and the processing from step S105-3 to step S110-3), which is enclosed by the broken line in FIG. 4, are performed in the arithmetic section of the controller 90.

The actuators 50B, 50C for varying the displacements of the other variable displacement motors 12B, 12C receive from the controller 90 the displacement control signals CS2, CS3 corresponding to the updated values V2, V3 determined in the same manner.

After the displacement control signals CS1, CS2, CS3 are once output to the actuators 50A, 50B, 50C, the processing from step S105-1 to step S110-1 (the processing from step S105-2 to step S110-2 and the processing from step S105-3 to step S110-3) are repeated in the same manner.

In the above processing, if the updated setting values V1, V2, V3 are the calculated values in steps S105-1, S105-2, S105-3, the displacements of the variable displacement motors 12A, 12B, 12C are varied to the displacements in accordance with the ratio of the actual sensed pressures P1, P2, P3 to the target drive pressure Pt (target pressure). Thus, the pressure in the fluid inflow part side of each of the variable displacement motors 12A, 12B, 12C approaches the target drive pressure Pt (target pressure).

In the above processing, if the updated setting value V1 is the maximum displacement V1max, the displacement of the variable displacement motor 12A is varied to or maintained at the maximum displacement V1max. If the updated setting value V1 is the minimum displacement V1min, the displacement of the variable displacement motor 12A is varied to or maintained at the minimum displacement V1min. Therefore, the actuators 50A, 50B, 50C for varying the displacements of the variable displacement motors 12A, 12B, 12C will not receive command values for varying the displacements to exceed the rated maximum displacement V1max of the variable displacement motors 12A, 12B, 12C or command values for varying the displacements to fall below the rated minimum displacement V1min of the variable displacement motors 12A, 12B, 12C.

Advantageous Effects of the Embodiment

As described above, in the hydraulic drive system 10 according to this embodiment, when multiple drive parts are operated simultaneously, the displacement varying parts 13 of the variable displacement motors 12A, 12B, 12C are controlled by the controller 90 such that the pressures in the fluid inflow parts of the multiple variable displacement motors 12A, 12B, 12C in operation approach a common target pressure. This allows the variable displacement motors 12A, 12B, 12C to provide the required amount of work to respective corresponding drive parts, with the pressures in the fluid inflow parts maintained close to the target pressure that is common to the motors. Therefore, when the hydraulic drive system 10 according to this embodiment is employed, it is no longer necessary to discharge much of the hydraulic fluid once pressurized to a high pressure by the hydraulic pump 1 for reducing the pressure in the feed channel for each motor or to reduce the cross-sectional area of the channel to consume the hydraulic fluid as a pressure drop. This makes it possible to reduce energy loss occurring when multiple drive parts are operated simultaneously. Therefore, when the hydraulic drive system 10 according to this embodiment is employed, the hydraulic pump 1 and the power source such as the engine or electric motor for driving the hydraulic pump 1 can have a smaller size and a smaller weight. Therefore, it is advantageous to install the hydraulic drive system 10 in a construction machine such as the excavator 100.

Also, in the hydraulic drive system 10 according to the embodiment, the controller 90, which serves as the control unit, controls the displacement varying parts 13 of the variable displacement motors 12A, 12B, 12C such that the displacements of the variable displacement motors 12A, 12B, 12C in operation are varied within respective ranges from the rated minimum displacements to the rated maximum displacements of the variable displacement motors 12A, 12B, 12C. Therefore, the actuators 50A, 50B, 50C for operating the displacement varying parts 13 of the variable displacement motors 12A, 12B, 12C will not receive command values for varying the displacements to exceed the rated maximum displacements of the variable displacement motors 12A, 12B, 12C or command values for varying the displacements to fall below the rated minimum displacements of the variable displacement motors 12A, 12B, 12C. Therefore, when the hydraulic drive system 10 according to this embodiment is employed, it is possible to inhibit excessive load from acting on the actuators 50A, 50B, 50C.

Other Embodiment 1

Figure 5:
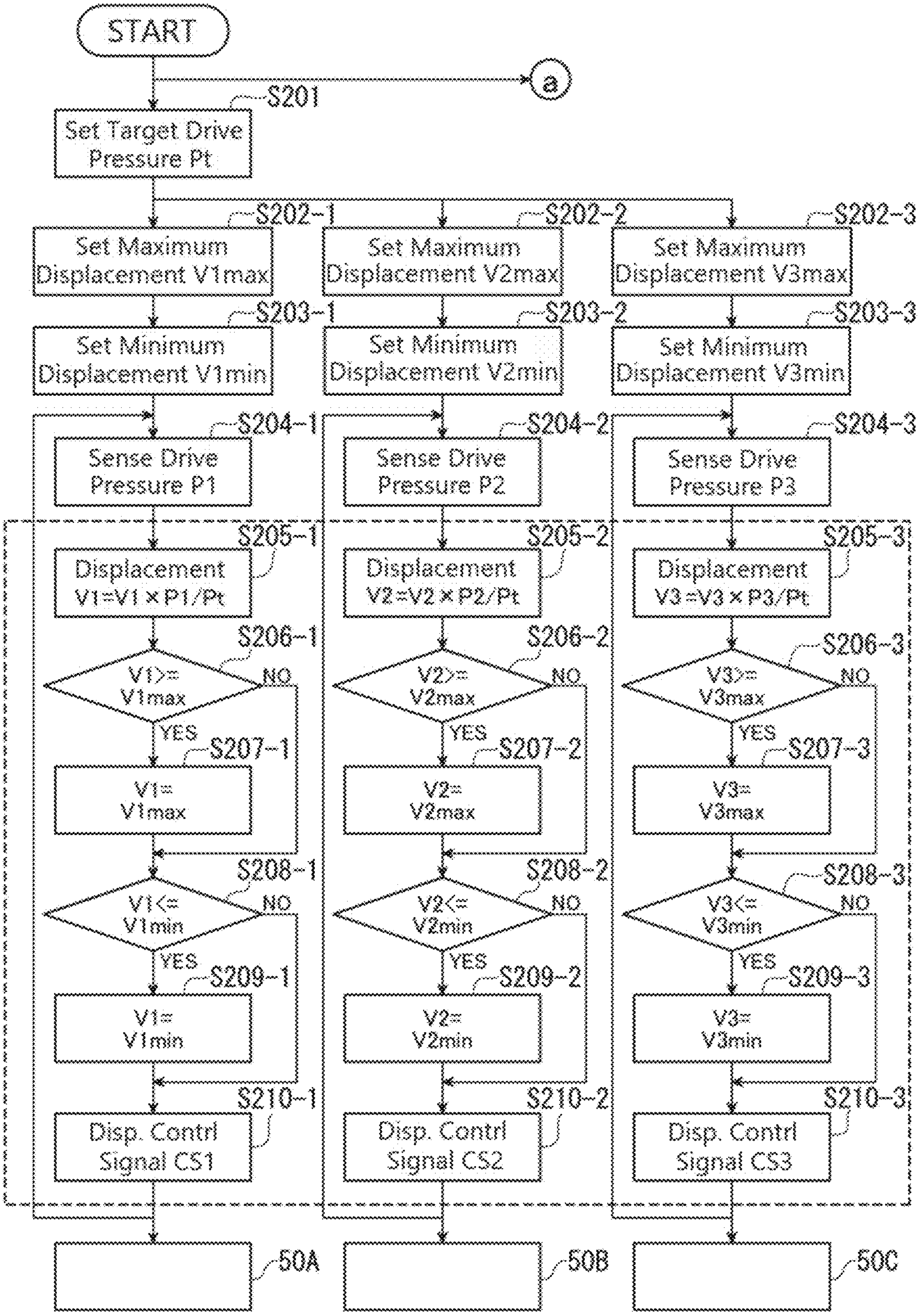
FIG. 5 is a flowchart showing an example of control of the hydraulic drive system according to another embodiment.
Figure 6:
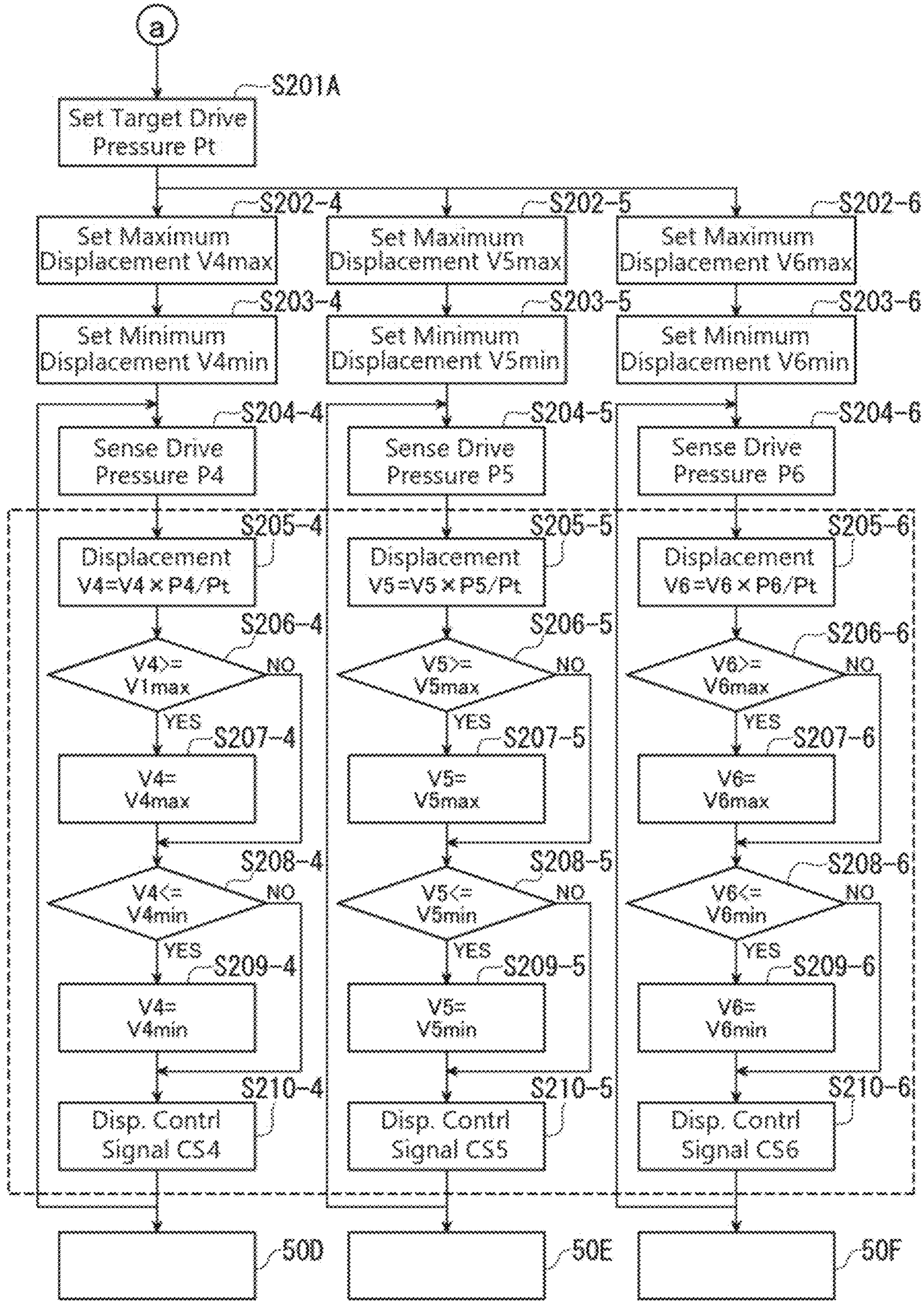
FIG. 6 is a flowchart showing an example of control of the hydraulic drive system according to the other embodiment.

FIGS. 5 and 6 are flowcharts showing an example of control of the hydraulic drive system according to another embodiment. In the hydraulic drive system 10 according to the above embodiment, by way of an example, three variable displacement motors 12A, 12B, 12C are arranged in one hydraulic circuit 3. In contrast, the hydraulic drive system according to this embodiment includes, byway of an example, a total of six variable displacement motors, three each in two hydraulic circuits. Each of the hydraulic circuits has the same configuration as in the above embodiment and is separately equipped with a hydraulic pump.

FIG. 5 shows the steps of controlling the three variable displacement motors in the first hydraulic circuit. FIG. 6 shows the steps of controlling the three variable displacement motors in the second hydraulic circuit. In step S201 shown in FIG. 5, the target drive pressure Pt (target pressure) in the first hydraulic circuit is set. In step S201A shown in FIG. 6, the target drive pressure Pt (target pressure) in the second hydraulic circuit is set. The method of generating the displacement control signals CS1 to CS6 in these hydraulic circuits is the same as in the above embodiment. In the flowcharts of FIGS. 5 and 6, the steps related to the first, second, and third variable displacement motors provided in the first hydraulic circuit are marked with the numerals "1," "2," and "3" following the hyphen ("-"), respectively. The steps related to the fourth, fifth, and sixth variable displacement motors provided in the second hydraulic circuit are marked with the numerals "4," "5," and "6" following the hyphen ("-"), respectively. The same numbers are used for variables in the steps related to each variable displacement motor. The contents of the steps related to each variable displacement motor are all the same as in steps S102-1 to S110-1 of the above embodiment. Therefore, the details of each step are not described. In FIGS. 5 and 6, the steps that correspond to the steps in the above embodiment are marked with a three-digit number starting with "2" in place of "1."

Advantageous Effects of Other Embodiment 1

As described above, the hydraulic drive system according to this embodiment performs the same displacement control as in the above embodiment for each of the three variable displacement motors in the two hydraulic circuits. Specifically, in this embodiment, when multiple drive parts are operated simultaneously in each hydraulic circuit, the displacement varying parts of the variable displacement motors are controlled by the controller such that the pressures in the fluid inflow parts of the multiple variable displacement motors operated in each hydraulic circuit approach a common target drive pressure Pt (target pressure). Therefore, in the hydraulic drive system according to this embodiment, even when more drive parts are operated simultaneously than in the above embodiment, energy loss can be likewise reduced by controlling the displacement varying parts of the variable displacement motors as described above.

Other Embodiment 2

In each of the above embodiments, the controller, which serves as the control unit, performs the following control (a) and (b) when operating multiple drive parts simultaneously. (a) Based on the sensed pressure in the fluid inflow part of each variable displacement motor in operation, the controller controls the displacement varying part of each variable displacement motor such that the pressure in the fluid inflow part of each variable displacement motor in operation approaches a common target pressure. (b) The controller 90 controls the displacement varying parts of the variable displacement motors such that the displacements of the variable displacement motors in operation are varied within respective ranges from the rated minimum displacements to the rated maximum displacements of the variable displacement motors. The controller, which serves as the control unit, may perform the following control (c) in addition to or instead of (a) and (b) above when operating multiple drive parts simultaneously. (c) The controller controls the displacement varying parts of variable displacement motors such that the overall flow rate of the variable displacement motors in operation is equal to or less than a prescribed flow rate.

Specifically, for example, when a prescribed flow rate Vp is set at the maximum flow rate that can be tolerated in the hydraulic circuit of the hydraulic drive system, a coefficient A is set as in Formula (1) below.

$$A = Vp/\{(V1+V2+V3)\times C\} \quad (1)$$

C: fixed coefficient

In the step of controlling the displacement of each variable displacement motor by the controller, the setting values V1, V2, V3 . . . for the displacements of the variable displacement motors calculated when the control signals were output last time are multiplied by the above coefficient A as follows: V1=A×V1, V2=A×V2, V3=A×V3 . . . . This step can be added, for example, in the flowchart of FIG. 4 after the steps S105-1, S105-2, S105-3 . . . . Addition of this step makes it possible to control the displacement varying parts of the variable displacement motors such that the overall flow rate of the variable displacement motors in operation is equal to or less than the prescribed flow rate Vp.

Advantageous Effects of Other Embodiment 2

In the hydraulic drive system according to this embodiment, the controller controls the displacement varying parts of variable displacement motors such that the overall flow rate of the variable displacement motors in operation is equal to or less than the prescribed flow rate Vp. This eliminates the possibility that the actuators operating the displacement varying parts of the variable displacement motors receive a command value for causing the overall flow rate of the variable displacement motors in operation to exceed the prescribed flow rate Vp. Therefore, with the hydraulic drive system according to this embodiment, it is possible to eliminate the problem of the actuators receiving a command value exceeding the prescribed flow rate, thus failing to feed the hydraulic fluid to each variable displacement motor at the appropriate flow rate.

Other Embodiment 3

The controller, which serves as the control unit, may perform the following control (d) in addition to (a), (b), and (c) above when operating multiple drive parts simultaneously. It is also possible that the following control (d) is performed in place of the control (b)+(c) above, or in place of one of controls (b) and (c) above. (d) The controller controls the displacement varying parts of the variable displacement motors such that the overall horsepower of the variable displacement motors in operation is equal to or less than a prescribed horsepower.

Specifically, for example, when a prescribed horsepower W is set at the maximum horsepower that can be tolerated in the hydraulic drive system, a coefficient B is set as in Formula (2) below.

$$B = W/\{(P1\times V1\times N1+P2\times V2\times N2+P3\times V2\times V3)\times C\} \quad (2)$$

N1, N2, N3: rotational speeds of the output shafts of the variable displacement motors C: fixed coefficient In the step of controlling the displacement of each variable displacement motor by the controller, the setting values V1, V2, V3 . . . for the displacements of the variable displacement motors calculated when the control signals were output last time are multiplied by the above coefficient B as follows: V1=B×V1, V2=B×V2, V3=B×V3 . . . . This step can be added, for example, in the flowchart of FIG. 4 after the steps S105-1, S105-2, S105-3 . . . . Addition of this step makes it possible to control the displacement varying parts of the variable displacement motors such that the overall horsepower of the variable displacement motors in operation is equal to or less than the prescribed horsepower W.

Advantageous Effects of Other Embodiment 3

In the hydraulic drive system according to this embodiment, the controller controls the displacement varying parts of variable displacement motors such that the overall horsepower of the variable displacement motors in operation is equal to or less than the prescribed horsepower W. This eliminates the possibility that the actuators operating the displacement varying parts of the variable displacement motors receive a command value for causing the overall horsepower of the variable displacement motors in operation to exceed the prescribed horsepower W. Therefore, with the hydraulic drive system according to this embodiment, it is possible to eliminate the problem of the actuators receiving a command value exceeding the prescribed horsepower W, thus causing an excessive load to act on the drive source that drives the hydraulic pump.

The present invention is not limited to the above-described embodiments, and the embodiments can be modified in a variety of designs without deviating from the spirit of the present invention. For example, the above embodiment uses the variable displacement motors 12A, 12B, 12C as the variable displacement actuators, but the variable displacement actuators are not limited to the variable displacement motors 12A, 12B, 12C. The variable displacement actuators can be direct-acting cylinder devices or the like as long as they are hydraulic actuators capable of varying the displacement.

In the above embodiment, the hydraulic drive system is applied to the excavator 100, which is a construction machine, but the hydraulic drive system can also be applied to construction machines other than the excavator 100. Furthermore, the application of the hydraulic drive system is not limited to construction machines, but it can also be applied to other apparatuses driven by multiple hydraulic actuators.

In the embodiments disclosed herein, a member formed of multiple components may be integrated into a single component, or conversely, a member formed of a single component may be divided into multiple components. Irrespective of whether or not the components are integrated, they are acceptable as long as they are configured to attain the object of the invention.

What is claimed is:

1. A hydraulic drive system, comprising:

a hydraulic pump configured to discharge a hydraulic fluid;

a plurality of variable displacement actuators each configured to receive a pressure of the hydraulic fluid discharged from the hydraulic pump to operate a corresponding one of a plurality of drive parts; and a control unit configured to control respective displacement varying parts of the plurality of variable displacement actuators, wherein the control unit is configured to:

acquire a common target pressure that is predetermined and common to the plurality of variable displacement actuators, and control the displacement varying parts of the variable displacement actuators, based on sensed pressures in fluid inflow parts of the variable displacement actuators in operation among the plurality of variable displacement actuators, such that the pressures in the fluid inflow parts of the variable displacement actuators in operation approach the acquired common target pressure that is common to the plurality of variable displacement actuators.

2. The hydraulic drive system of claim 1, wherein the control unit is configured to control the displacement varying parts of the variable displacement actuators such that displacements of the variable displacement actuators in operation are varied within respective ranges from rated minimum displacements to rated maximum displacements of the variable displacement actuators.

3. The hydraulic drive system of claim 1, wherein the control unit is configured to control the displacement varying parts of the variable displacement actuators such that both an overall flow rate of the variable displacement actuators in operation is equal to or less than a prescribed flow rate and the pressures in the fluid inflow parts of the variable displacement actuators in operation approach the acquired common target pressure.

4. The hydraulic drive system of claim 1, wherein the control unit is configured to control the displacement varying parts of the variable displacement actuators such that an overall horsepower of the variable displacement actuators in operation is equal to or less than a prescribed horsepower.

5. The hydraulic drive system of claim 1, wherein the control unit is configured to acquire the common target pressure that is predetermined based on a maximum pressure in a fluid inflow part of a variable displacement actuator, which requires a maximum flow rate to operate a drive part, among the plurality of variable displacement actuators.

6. A construction machine, comprising:

a plurality of drive parts; and a hydraulic drive system configured to receive a pressure of a hydraulic fluid to operate the plurality of drive parts, wherein the hydraulic drive system includes:

a hydraulic pump configured to discharge the hydraulic fluid;

a plurality of variable displacement actuators each configured to receive a pressure of the hydraulic fluid discharged from the hydraulic pump to operate a corresponding one of the plurality of drive parts; and a control unit configured to control respective displacement varying parts of the plurality of variable displacement actuators, wherein the control unit is configured to:

acquire a common target pressure that is predetermined and common to the plurality of variable displacement actuators, and control the displacement varying parts of the variable displacement actuators, based on sensed pressures in fluid inflow parts of the variable displacement actuators in operation among the plurality of variable displacement actuators, such that the pressures in the fluid inflow parts of the variable displacement actuators in operation approach the acquired common target pressure that is common to the plurality of variable displacement actuators.

* * * * *